United States Patent
Novak

(10) Patent No.: US 11,212,408 B2
(45) Date of Patent: Dec. 28, 2021

(54) MULTIMEDIA DEVICE, MULTIMEDIA ARRANGEMENT HAVING THE MULTIMEDIA DEVICE, AND METHOD FOR TRANSFERRING AN OPTICAL CODE USING THE MULTIMEDIA ARRANGEMENT

(71) Applicant: Robert Bosch GmbH, Stuttgart (DE)

(72) Inventor: Josef Novak, Zwiesel (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/846,737

(22) Filed: Apr. 13, 2020

(65) Prior Publication Data

US 2020/0329165 A1 Oct. 15, 2020

(30) Foreign Application Priority Data

Apr. 11, 2019 (DE) .......................... 102019205214.2

(51) Int. Cl.
*H04N 1/00* (2006.01)
*G06K 7/14* (2006.01)
*H04N 1/195* (2006.01)
*G06K 19/06* (2006.01)

(52) U.S. Cl.
CPC ....... *H04N 1/00824* (2013.01); *G06K 7/1417* (2013.01); *G06K 7/1439* (2013.01); *G06K 19/06112* (2013.01); *H04N 1/19594* (2013.01)

(58) Field of Classification Search
CPC ........... H04N 1/00824; H04N 1/19594; G06K 7/1417; G06K 7/1439; G06K 19/06112
USPC ......................................................... 235/454
See application file for complete search history.

(56) References Cited

U.S. PATENT DOCUMENTS

| | | | |
|---|---|---|---|
| 10,885,507 B1* | 1/2021 | Phillips | G06Q 20/4016 |
| 2013/0092737 A1* | 4/2013 | Saunders | G06K 7/10821 |
| | | | 235/462.1 |
| 2013/0155232 A1 | 6/2013 | Bauereiss | |
| 2019/0129850 A1* | 5/2019 | Chang | G06F 12/0804 |
| 2019/0306336 A1* | 10/2019 | Takenaka | H04N 1/00315 |
| 2020/0341868 A1* | 10/2020 | Carpenter | G06F 11/0709 |

FOREIGN PATENT DOCUMENTS

DE 102011088822 6/2013

* cited by examiner

*Primary Examiner* — Michael G Lee
*Assistant Examiner* — David Tardif
(74) *Attorney, Agent, or Firm* — Michael Best & Friedrich LLP

(57) ABSTRACT

A multimedia device 2 is proposed having a display unit 6 for displaying at least one optical code 5, wherein the optical code 5 is configured to be acquired by a read device 3, wherein the multimedia device 2 comprises a coding unit 4, wherein the coding unit 4 is configured to code operating data of the multimedia device 2 as the optical code 5.

12 Claims, 1 Drawing Sheet

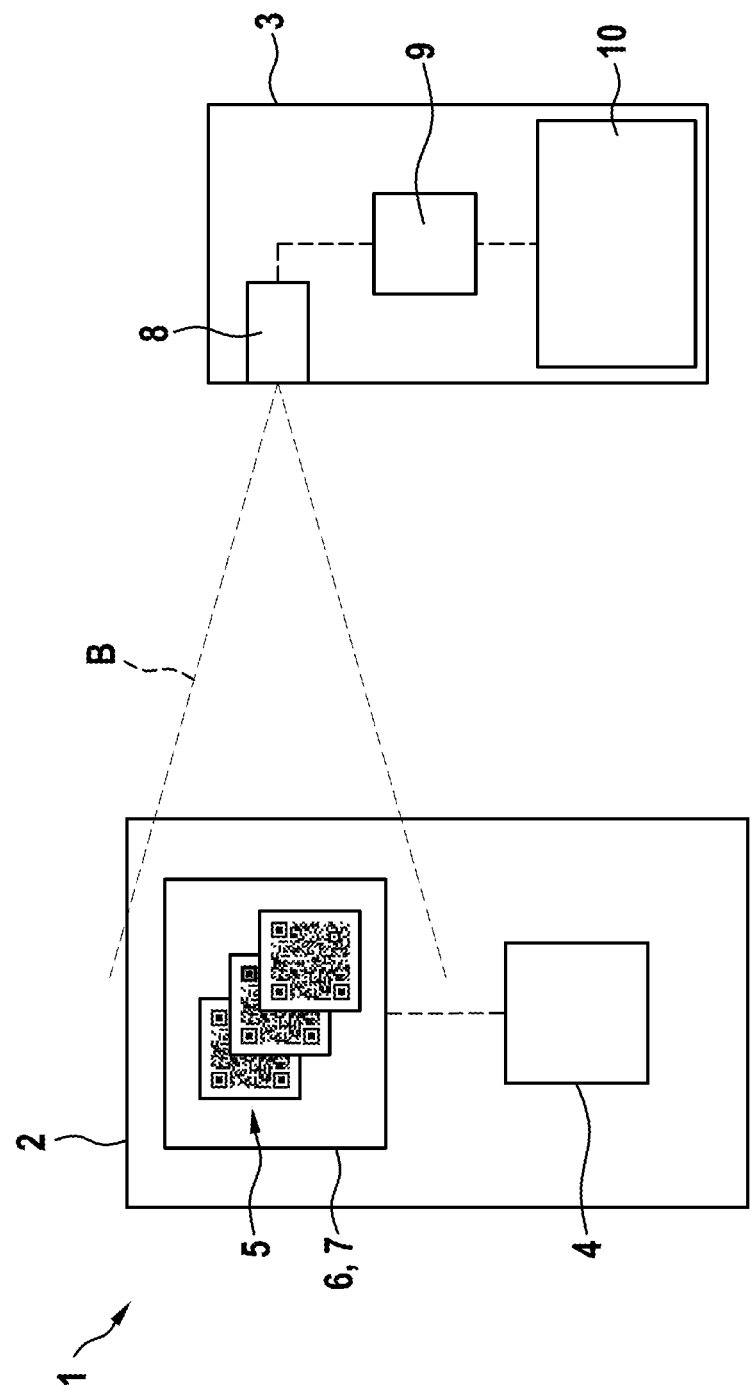

MULTIMEDIA DEVICE, MULTIMEDIA ARRANGEMENT HAVING THE MULTIMEDIA DEVICE, AND METHOD FOR TRANSFERRING AN OPTICAL CODE USING THE MULTIMEDIA ARRANGEMENT

BACKGROUND OF THE INVENTION

The invention relates to a multimedia device. The invention also relates to a multimedia arrangement and a method for transferring an optical code using the multimedia arrangement.

Multimedia devices log errors occurring at the runtime and other events as event logs (so-called "log file"), which can be used above all for error diagnosis. The log files are generally transferred for further processing to a data processing device, for example, PC or tablet. For this purpose, the data processing device typically has to be connected, for example, via ethernet, USB, Bluetooth, or WLAN, to the multimedia device, whereby an increased wiring and/or configuration expenditure exists.

Moreover, a wireless transfer of an item of configuration information for a monitoring camera via an optical signal is known from the prior art, which is filmed by the monitoring camera from a monitor of a handheld data processing unit.

The document DE 10 2011 088 822 A1, which probably forms the closest prior art, discloses a monitoring camera having at least one optical sensor unit for recording an optical signal from the surroundings of the monitoring camera, wherein the optical signal can comprise at least one coded data word, having a configuration unit for configuration of the monitoring camera, and having a decoder unit for decoding the coded data word, wherein the configuration unit is designed to use the decoded data word for the configuration of the monitoring camera.

SUMMARY OF THE INVENTION

The subject matter of the invention is a multimedia device. The multimedia device is used in particular to provide multimedia data, preferably text, graphics, image, video, and/or audio data.

The multimedia device comprises a display unit, which is designed for and/or capable of displaying at least one or precisely one optical code. In particular, the display unit is designed as an electrical display. The display unit is preferably designed as a display integrated into the multimedia device. Alternatively, the display unit is designed as an external display device, which has a signaling connection, preferably wired or wireless, to the multimedia device.

The optical code is designed for and/or capable of being acquired by a read device. In particular, the optical code is designed as an optoelectronically readable script. The optical code is preferably formed by at least one or precisely one row of characters. The optical code is particularly preferably formed by at least or precisely two or more successively arranged rows of characters. The characters are preferably formed as square and/or linear and/or differing-width characters, especially points and/or strokes.

In the scope of the invention, it is proposed that the multimedia device comprise a coding unit. The coding unit is designed for and/or capable of coding operating data of the multimedia device as the at least one optical code. The coding unit is used in particular for converting and/or embedding the operating data of the multimedia device into the one or in multiple optical codes. The coding unit is particularly preferably used to image the operating data as the characters in the optical code. In particular, the operating data can comprise one or more items of device information and/or diagnostic information and/or event logs of the multimedia device. The display unit is preferably activated and/or activatable by the coding unit.

The advantage of the invention is in particular that due to the coding of the operating data as an optical code, these data can be read particularly simply and rapidly by a read device. In particular, a wiring and/or configuration effort of the read device to the multimedia device can thus be prevented. The operating data can thus be read particularly simply from devices without further interfaces such as USB, Bluetooth, ethernet, etc.

In one specific implementation of the invention, it is provided that the operating data comprise one or more log files of the multimedia device. The log file is also known as a so-called "log file". In particular, the log file comprises an automatically kept log, in particular event log, of processes of the multimedia device. The log file preferably comprises at least one or precisely one log line having at least one timestamp, preferably date and/or time of day, and an associated event. In particular, all events or specific events are written by the multimedia device in the log file in accordance with a log level.

A multimedia device is thus proposed which is distinguished by a particularly simple and rapid provision of log files, in particular for error diagnosis.

In one preferred design, it is provided that the coding unit is designed for and/or capable of allocating the operating data and coding these data as multiple individual, in particular different optical codes. In principle, different types of operating data, for example, the device information, diagnostic information, log file, etc. may each be coded, preferably embedded, in a separate optical code. However, specific operating data, in particular the log file, may particularly preferably be segmented by the coding unit and coded in individual optical codes. For example, in each case at least one or precisely one log line can be coded in one optical code. Alternatively, however, multiple log lines may also be combined into one common optical code.

It is therefore a concept of the invention to propose a multimedia device which can provide the operating data as the optical code independently of the data volume. It is thus possible to provide volatile operating data, i.e., operating data which are not restorable after the device is switched off and on, and/or very large amounts of operating data, in particular log files, and to store them and/or further process them and/or archive them in another manner on the read device persistently, independently of the logging multimedia device.

In one refinement of the invention, it is provided that the display unit is designed for and/or capable of displaying the multiple optical codes in series and/or in a loop. The display unit is particularly preferably designed for and/or capable of animating the multiple optical codes. In particular, "animation" is to be understood as an n-fold change of the multiple optical codes in the display unit at n points in time. The optical codes are preferably displayed in succession in a fixed sequence and/or at chronologically fixed intervals by the display unit. The multiple optical codes are particularly preferably displayed in chronological sequence, in particular in dependence on the timestamp. The coding unit is particularly preferably designed to transfer the operating data with a header, in particular sequence header, into the multiple optical codes. In particular, the header contains additional items of information which are used for assigning and/or sorting the optical codes and/or describe the processing of the operating data by the read device.

A multimedia device is thus proposed which is designed to provide the n-fold quantity of information by an n-fold change of the various optical codes. An arbitrary quantity of operating data can thus be transferred particularly simply.

It is preferably provided that the at least one or precisely one optical code is a 2D code. In principle, the 2D code can be a stacked code. However, the 2D code is preferably a matrix code, particularly preferably a QR code. In particular, the multiple optical codes are displayable by the display unit as an animated 2D code, preferably as an animated QR code.

A multimedia device is thus proposed which may be read particularly simply and rapidly by corresponding read devices.

In a further preferred design, it is provided that the display unit comprises a display screen for generating the optical code. The display screen is preferably designed as a monochrome or color display screen. The display screen can especially be designed as a touchscreen.

Therefore, any multimedia device which comprises at least one monochrome display screen can be read by the read device.

In one specific design, the multimedia device is designed as an audio device. In particular, the audio device is used for converting, processing, recording, and/or playing back audio signals. In particular, the audio device can be a component of a multimedia system, for example, a sound system. The multimedia system can especially comprise a plurality of the audio devices. The audio device is preferably an active loudspeaker or a power amplifier or an audio mixing console or an audio matrix.

A further subject matter of the invention relates to a multimedia arrangement having the multimedia device as described above and/or according to one of the preceding claims. The multimedia arrangement comprises a read device, which is designed for and/or capable of acquiring the optical code. The read device is used in particular for the contactless and/or optical acquisition of the optical code. In principle, the read device can acquire the optical code by means of red light or infrared light. However, the read device can particularly preferably acquire the optical code photographically. The read device is especially designed as a mobile, in particular handheld read device.

The read device comprises a decoding unit, which is designed for and/or capable of decoding the optical code. The decoding unit is preferably used for restoring original items of information, which are embedded in the optical code in particular. The decoding unit can be implemented as a software module and/or as a hardware module.

In one preferred specific embodiment, it is proposed that the read device be designed as a portable data processing device. In particular, a portable data processing device is to be understood as any mobile, portable, and/or handheld device which is designed to acquire the optical code displayed on the display unit and to decode it or at least to relay it to a corresponding decoding unit. The read device is preferably designed as a smart phone, a tablet PC, a Pocket PC, or a notebook.

A variety of mobile devices can thus be used as the read device, so that no special hardware has to be acquired and/or carried along to read the optical code.

In one specific refinement, it is provided that the read device, in particular the portable data processing device, comprises a camera or at least has a signaling connection thereto. The camera can preferably be integrated into the read device. Alternatively, however, the camera can also be an external camera which has a signaling connection to the read device. The camera is designed to record the optical code as an image file. The camera can preferably record the at least one optical code from the display unit as an image and/or video for this purpose. The optical code is preferably projected onto an image sensor, in particular CCD sensor or CMOS sensor, of the camera and the recorded image is thus provided as the image file to the decoding unit. The camera is preferably designed as a digital camera.

A read device is thus proposed, which can be formed by any mobile device which already comprises a camera or can be connected thereto.

In a further design, it is provided that the decoding unit is designed as an app, in particular a software app. In particular, the app is application software installed on the read device, preferably on the portable data processing device, for interpreting the optical code. In particular, the app is used for the digital image processing of the image file. In particular, the app is designed for and/or capable of activating the camera. The app preferably activates the camera until all optical codes are completely input for the complete restoration of the original operating data. If one of the multiple optical codes should not be able to be read, the camera is activated again and waits for the next, redundant optical code of the loop.

A read device is thus proposed which can be configured particularly simply for reading the multimedia device. The configuration expenditure can thus be significantly reduced.

In one preferred embodiment, the decoding unit is designed for and/or capable of compiling the allocated operating data again, in particular the allocated log file, during the decoding of the multiple optical codes. The decoding unit is preferably designed to completely restore the original operating data of the multimedia device. In particular, the multiple optical codes are acquired by the read device until all optical codes and/or all operating data, in particular all log lines, are provided. The read device is particularly preferably designed to display and/or further process and/or store the compiled operating data.

It is therefore a concept of the invention to propose a read device which can completely restore the operating data originally provided by the multimedia device.

In a further embodiment of the invention, it is proposed that the read device be designed for and/or capable of providing and/or using the operating data for a data analysis. In particular, the operating data can be transmitted as a data packet, for example, via email to the support department of the producer of the multimedia device. Alternatively or optionally additionally the operating data can be archived, in particular internally on the read device or externally on the server. The data analysis particularly preferably comprises a log file analysis, wherein for this purpose the log file, in particular the log lines, are searched according to specific criteria, in particular for errors.

A read device is thus proposed which is distinguished by particularly rapid and simple analysis of the operating data, in particular for error diagnosis of the multimedia device.

A further subject matter of the invention relates to a method for transferring at least one or precisely one optical code using the multimedia arrangement as already described above. In a first step, the operating data of the multimedia device are coded by the coding unit as the at least one or precisely one optical code. In particular, the operating data are allocated and coded into multiple different optical codes.

The coding unit subsequently activates the display unit, so that the at least one optical code or the multiple optical codes is/are displayed by the display unit. In principle, the one optical code is displayed permanently on the display screen of the display unit in a transfer mode of the display unit. The multiple optical codes are preferably displayed alternately in series and in a loop on the display screen of the display unit in a transfer mode of the display unit. The transfer mode can be set manually or can be set automatically by the display unit, for example.

In a further step, the optical code is acquired by the read device. In particular, the optical code is recorded via the camera of the read device as the image file. The camera is activated in this case by the decoding unit, in particular the app. The multiple optical codes are preferably input by the decoding unit until all operating data are available. If one of the optical codes should not be able to be read and/or decoded, the next, redundant optical code of the loop is preferably awaited.

In a further step, the optical code is or the optical codes are decoded by the decoding unit. If all operating data are present, they can be displayed and/or further processed by the read device. The operating data can especially be displayed directly on the read device.

BRIEF DESCRIPTION OF THE DRAWINGS

The present invention is explained further hereafter on the basis of the drawing, wherein further advantages, features, and effects can be inferred from the description of the FIGURE. In the FIGURE:

FIG. 1 shows a schematic illustration of a multimedia arrangement as an exemplary embodiment of the invention.

DETAILED DESCRIPTION

FIG. 1 shows, in a very schematic illustration, a multimedia arrangement 1. The multimedia arrangement 1 comprises at least one multimedia device 2 and a read device 3. The multimedia device 2 is designed, for example, as an audio device for outputting and/or processing audio signals. For example, the multimedia arrangement 1 can comprise a plurality of the audio devices, for example, to form a sound system. In the simplest case, the multimedia device 2 can be designed, for example, as an active loudspeaker.

The multimedia device 2 comprises a coding unit 4 for coding operating data of the multimedia device 2 in one or more optical codes 5. The operating data preferably comprise a log file, also known as a so-called "log file", wherein the multimedia device 2 logs errors occurring at the runtime and other events and writes them in the log file. This log file is of interest above all for error diagnosis for the producer of the devices, since, for example, its development and support engineers can thus produce rapid and reliable error diagnoses. For this purpose, the log file is generally transferred to a data processing device, for example, PC or tablet, to be able to process it further. Depending on the device, such a log file can be persistently stored, for example, in the case of central, administrative system components, or can be temporarily available, for example, in the case of a microprocessor-assisted active loudspeaker. Moreover, the operating data, in particular the log file, can be of different sizes with respect to the data volume thereof.

The restriction when reading the log file via the typical interfaces, for example, USB, ethernet, Bluetooth, WLAN, etc., consists of the wiring and/or configuration effort to be made. The faster and more easily the log file can be reached, the more probable it is that, for example, the customer will also transfer it to the producer and thus faster and more reliable statements can be made about determined errors. Moreover, the log file can also contain items of information for error diagnosis which are valuable for the customer.

In the exemplary embodiment shown, the multimedia device 2 comprises a display unit 6 for the optical display of the at least one optical code 5. The display unit 6 comprises for this purpose a display screen 7, for example, a monochrome display or a high-resolution color display. The display unit 6 has a signaling connection to the coding unit 7, wherein the coding unit 7 codes the operating data, in particular the log file, in the optical code and transfers it to the display unit 6. In the case of a data volume of the operating data which cannot be imaged in a single optical code 5, the coding unit 4 is designed to allocate the operating data and code the data in multiple different optical codes 5. For example, the log file can consist of multiple log lines, wherein one or more log lines can be embedded in each case in a separate optical code 5.

The optical codes 5 are each formed, for example, as a 2D code, in particular QR codes. The display unit 6 is designed to animate the optical codes 5, wherein animate means that the different optical codes 5 are displayed in series on the display screen 7. In addition, the optical codes 5 can be displayed in a loop on the display screen 7.

The read device 3 is used for acquiring the optical codes 5 from the display screen 7. For this purpose, the read device 3 comprises a camera 8, wherein the camera 8 can record the display screen 7 within an acquisition region B and provide the displayed optical code 5 to the read device 3 as an image file. The read device 3 is designed as a mobile data processing device, for example, smart phone or tablet, wherein the camera 8 is designed, for example, as an integrated digital camera.

The read device 3 comprises a decoding unit 9 for decoding the optical code 5. The decoding unit 9 is designed, for example, as a software module, in particular an app, which decodes the optical codes 5 by analyzing the image files recorded by the camera 8. For this purpose, the camera 8 of the read device 3 solely has to be oriented having the acquisition region B on the display screen 7 of the multimedia device 2 and the corresponding app has to be started on the read device 3. In this case, the display unit 6 is in a transfer mode, wherein the multiple optical codes 5 are displayed in succession, for example, in chronological sequence, on the display screen 7.

The optical codes 5 are read into the read device 3 until all items of log information (log lines) are transferred to restore the log file and/or are available in the decoding unit 9. In particular, the coding unit 4 is designed to transfer the items of log information, for example, additionally having a specific sequence header, into the optical codes 5. If one or more items of log information should not be able to be read, the next redundant item of log information in the loop is awaited.

If all items of log information are provided, the log file can be restored by the decoding unit 9 by compiling all items of log information. The log file can subsequently be displayed on a display screen 10 of the read device 3. The log file can thus be analyzed directly on location or also sent for further processing, for example, via email to the support department of the producer or also simply archived. For example, the log file can be subjected to a log file analysis, wherein the log file is searched according to specific criteria, for example, errors, accesses, etc.

The end customer thus has the option of reading the operating data, in particular the log file, of the multimedia device 2, without having to connect the read device in a complex manner to the multimedia device 2. Moreover, the invention offers the option of securing the items of information persistently even in the case of small devices without persistent log memory and without further interfaces such as USB, Bluetooth, ethernet, etc. Therefore, for example, active loudspeakers which possibly had problems during an event can be read particularly rapidly and easily.

The invention claimed is:

1. A multimedia device (2) configured as an audio device of a sound system, the multimedia device (2) configured to generate volatile operating data during runtime of the multimedia device (2), the multimedia device (2) comprising:
    a display unit (6) configured to display at least one optical code (5), wherein the optical code (5) is configured to be acquired by a read device (3); and
    a coding unit (4), wherein the coding unit (4) is configured to code the volatile operating data of the multimedia device (2) as the optical code (5), wherein the volatile operating data includes one or more log files including errors occurring during the runtime of the multimedia device (2).

2. The multimedia device (2) according to claim 1, wherein the coding unit (4) is configured to allocate the volatile operating data and code the data as multiple individual optical codes (5).

3. The multimedia device (2) according to claim 2, wherein the display unit (6) is configured to display the multiple optical codes (5) in series, in a loop, or both in a series and in a loop.

4. The multimedia device (2) according to claim 1, wherein the at least one optical code (5) is a 2D code.

5. The multimedia device (2) according to claim 1, wherein the display unit (6) comprises a display screen (7), wherein the display unit (6) is configured to display the optical code (5) via the display screen (7).

6. A multimedia arrangement (1) having the multimedia device (2) according to claim 1, and further comprising a read device (3) for acquiring the optical code (5), wherein the read device (3) comprises a decoding unit (10) for decoding the optical code (5).

7. The multimedia arrangement (1) according to claim 6, wherein the read device (3) is configured as a portable data processing device.

8. The multimedia arrangement (1) according to claim 7, wherein the read device (3) comprises a camera (8), wherein the camera (8) is configured to record the optical code (5) as an image file.

9. The multimedia arrangement (1) according to claim 8, wherein the decoding unit (10) is an app, wherein the app is configured to decode the optical code (5) by way of an analysis of the image file.

10. The multimedia arrangement (1) according to claim 6, wherein the decoding unit (10) is configured to compile the allocated operating data during the decoding of the multiple optical codes (5).

11. The multimedia arrangement (1) according to claim 6, wherein the read device (3) is configured to provide, use, or provide and use the volatile operating data for a data analysis.

12. A method for transferring at least one optical code (5) using a multimedia arrangement (1), configured as an audio device of a sound system, the multimedia device (2) configured to generate volatile operating data during runtime of the multimedia device (2), the multimedia device (2), that includes a display unit (6) configured to display at least one optical code (5), wherein the optical code (5) is configured to be acquired by a read device (3); a coding unit (4), wherein the coding unit (4) is configured to code the volatile operating data of the multimedia device (2) as the optical code (5); and a read device (3) for acquiring the optical code (5), wherein the read device (3) comprises a decoding unit (10) for decoding the optical code (5), the method comprising:
    coding volatile operating data of the multimedia device (2) via the coding unit (4) as the at least one optical code (5);
    displaying the optical code (5) via the display unit (6);
    acquiring the optical code (5) via the read device (3); and
    decoding the optical code via the decoding unit (10),
    wherein the volatile operating data includes one or more log files including errors occurring during the runtime of the multimedia device (2).

* * * * *